(12) United States Patent
Dolgas et al.

(10) Patent No.: US 6,357,689 B1
(45) Date of Patent: Mar. 19, 2002

(54) STATOR WINDING APPARATUS

(75) Inventors: Patrick A. Dolgas, Milford; Lawrence E. Newman, Tipp City, both of OH (US)

(73) Assignee: Globe Products Inc., Huber Heights, OH (US)

( * ) Notice: Subject to any disclaimer, the term of this patent is extended or adjusted under 35 U.S.C. 154(b) by 0 days.

(21) Appl. No.: 09/334,547

(22) Filed: Jun. 16, 1999

Related U.S. Application Data

(60) Provisional application No. 60/089,626, filed on Jun. 16, 1998.

(51) Int. Cl.[7] ............................................. H02K 15/085
(52) U.S. Cl. .................................................... 242/432.6
(58) Field of Search ...................................... 242/432.6

(56) References Cited

U.S. PATENT DOCUMENTS

| | | |
|---|---|---|
| RE25,281 E | 11/1962 | Moore |
| 3,251,559 A | 5/1966 | Moore |
| 3,281,084 A | 10/1966 | Lill |
| 3,464,639 A | 9/1969 | Harelson et al. |
| 3,648,938 A | 3/1972 | Dryburgh |
| 3,901,454 A | 8/1975 | Reiger, Jr. |
| 4,732,338 A | 3/1988 | Eminger et al. |
| 4,762,283 A | 8/1988 | Sabatino |
| 4,982,908 A | 1/1991 | Luciani |
| 5,197,685 A | 3/1993 | Banner |
| 5,340,043 A | 8/1994 | Beakes et al. |
| 5,664,317 A | * 9/1997 | Ponzio et al. ............ 242/432.6 |
| 5,687,927 A | 11/1997 | Beakes et al. |

* cited by examiner

*Primary Examiner*—Katherine A. Matecki
(74) *Attorney, Agent, or Firm*—Roger S. Dybvig

(57) ABSTRACT

A winding form assembly for a stator winding machine includes a pair of winding forms mounted on a stator pole piece and a latch assembly for latching the winding forms to one another. Two ways to support the forms on the pole piece and two latch mechanisms are disclosed.

19 Claims, 4 Drawing Sheets

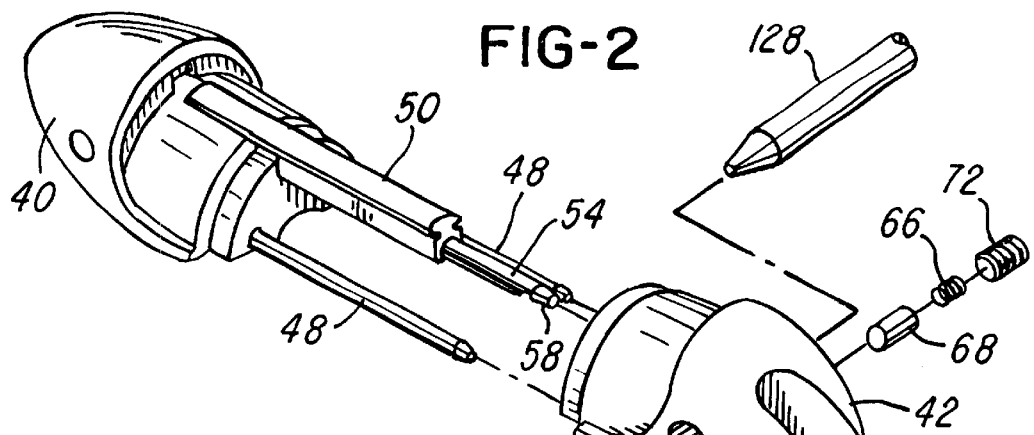
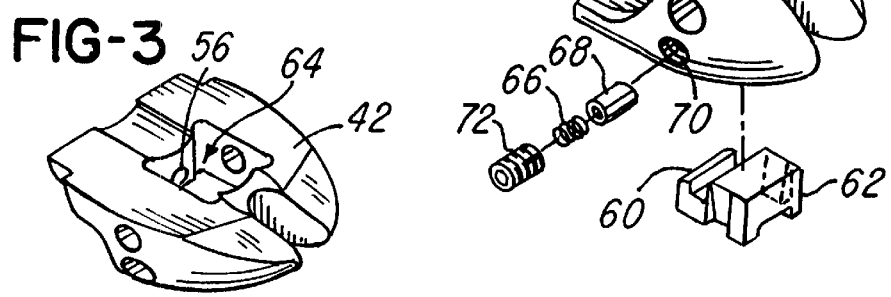
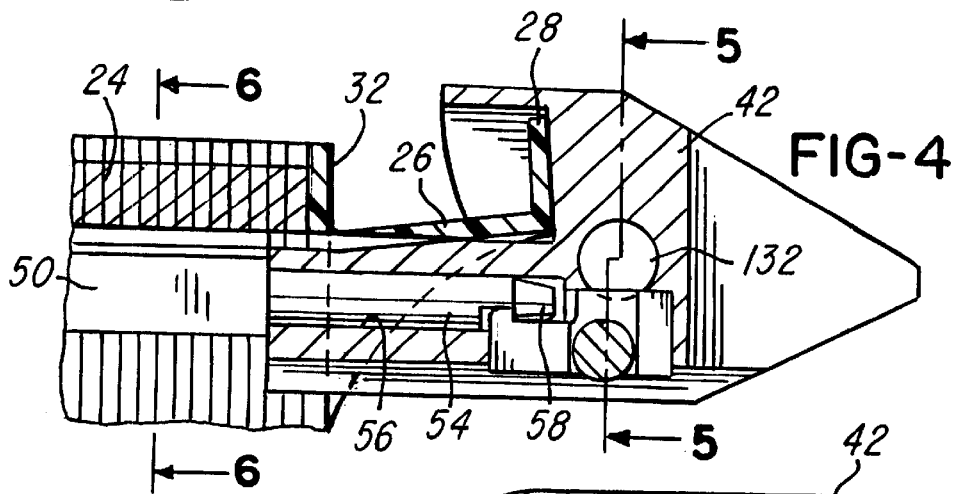
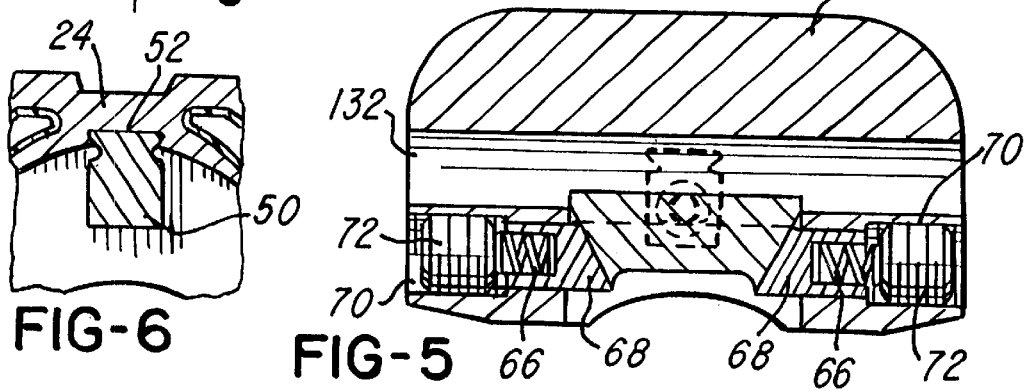

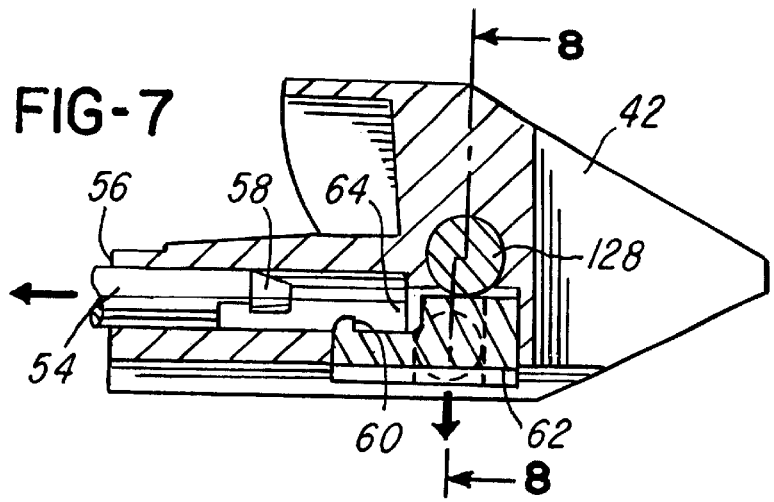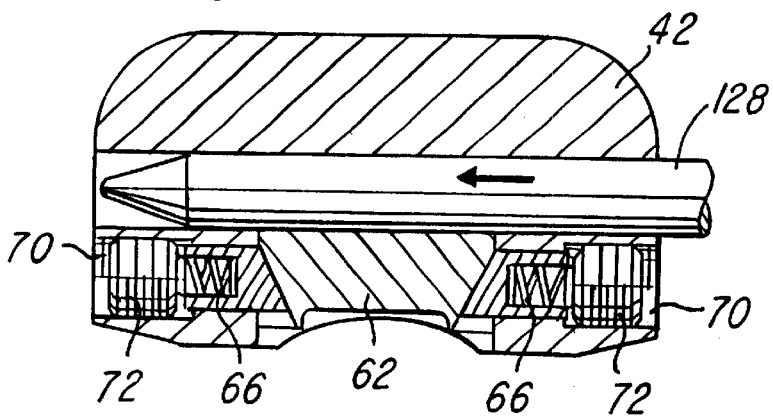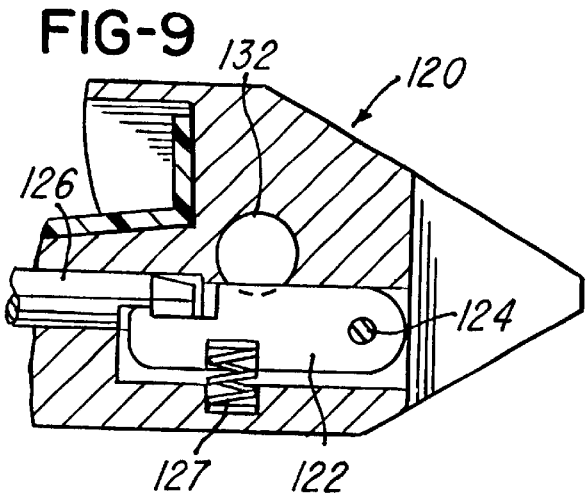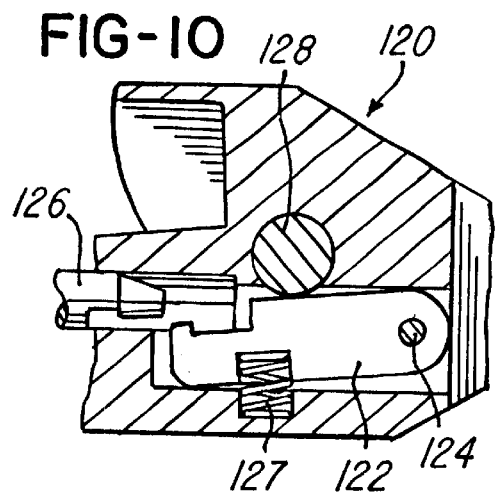

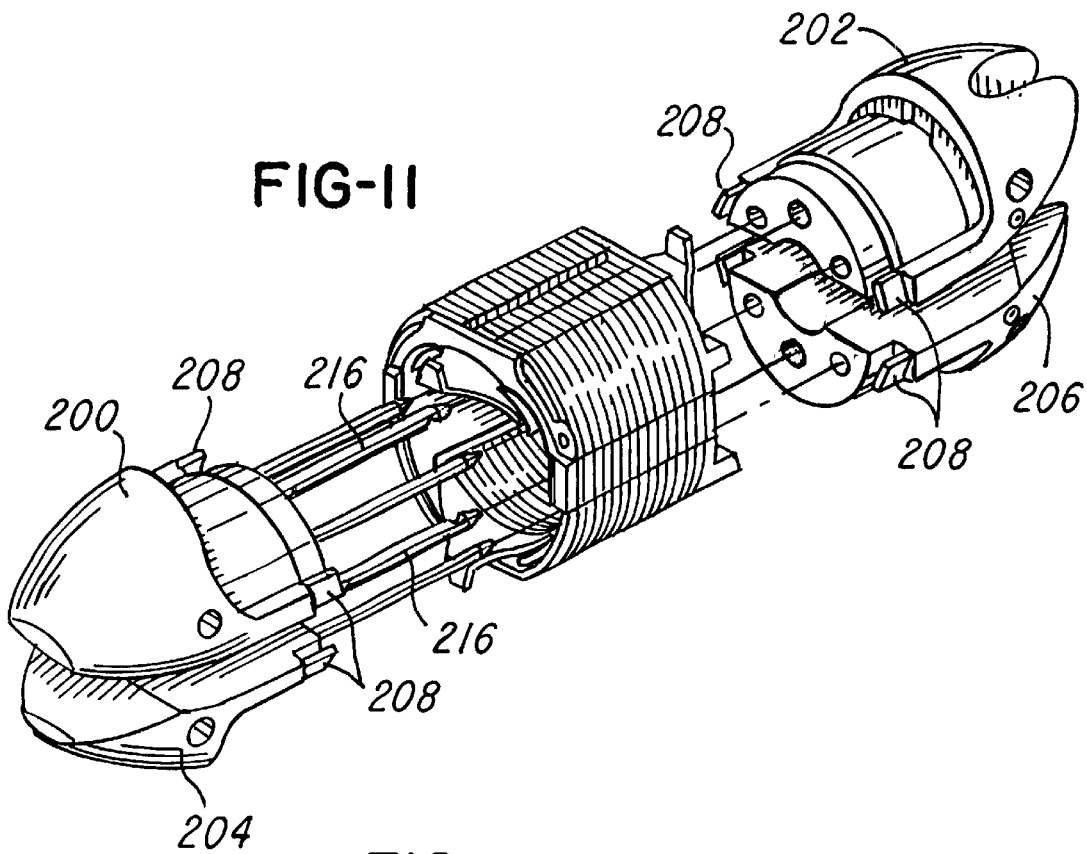
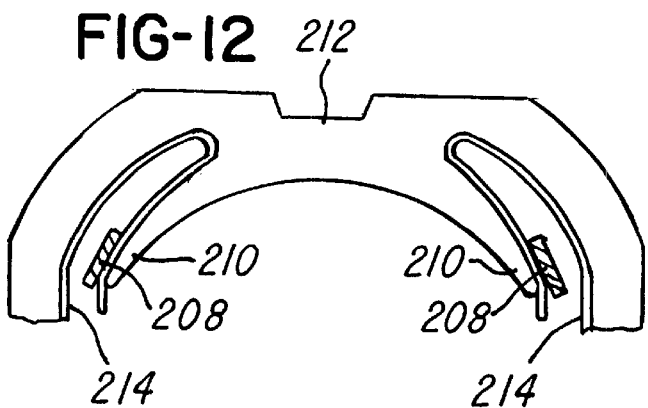

STATOR WINDING APPARATUS

CROSS REFERENCE TO RELATED APPLICATIONS

This application claims the benefit of U.S. Provisional Application No. 60/089,626 filed Jun. 16, 1998.

INCORPORATION BY REFERENCE

The disclosures of U.S. Pat. No. 5,197,685, granted Mar. 30, 1993 to Alvin C. Banner, and U.S. Pat. No. 5,340,043, granted Aug. 23, 1994 to John M. Beakes and Lawrence E. Newman, are hereby incorporated by reference herein.

FIELD OF THE INVENTION

This invention relates to a method and apparatus for winding stators for dynamoelectric devices and, although not so limited, especially to a method and apparatus for winding two pole stators.

BACKGROUND OF THE INVENTION

This invention is intended for use with well known methods and apparatus for winding stators wherein coils of wire drawn from sources of wire under tension are wound around the pole pieces on a laminated stator core by a reciprocating and oscillating winding head or ram. The winding head or ram is driven by a mechanism such as that shown in U.S. Pat. No. 4,158,314. A common practice when winding two pole stators in this fashion is to use two pairs of oppositely directed shrouds or winding forms, one pair for each pole, that guide the wire segments exiting from the winding head around the pole pieces. The shrouds or winding forms are usually secured to the stator by pairs of form-retaining clamps or blades but it has been recognized that there are disadvantages to the use of the form retaining blades. The manipulations required to operate the blades or clamps are time-consuming and significantly limit production speeds. In addition, space for insertion of the blades must necessarily be provided by a gap between the end faces of the stator core and the coil end turns, a factor which can have a negative effect upon the characteristics of the wound coils. For another thing, there have been reports that compounds used to trickle impregnate the stator coils occasionally flow through the gap into the bore of the stator.

The aforementioned Banner '685 patent discloses winding forms provided with mutually-engaging latching members which interconnect a pair of cooperating winding forms. A spring acting on one of the latch members serves to bias the winding forms into engagement with the stator assembly. The Banner '685 winding forms are designed for winding stators of the type having coil support extensions connected to the pole pieces and extending from both end faces of the stator for the purpose of supporting the stator coil end turns. The coil support extensions have outwardly directed coil-retaining fingers spaced from the end faces of the stator core. The winding forms are provided with pockets which receive the coil retaining fingers for preventing the winding forms from moving radially inwardly when stator coils are being wound. A drawback to the use of the Banner '685 winding forms is that their use required changes in the winding form-handling carriages that load the winding forms onto a stator being wound and unload them from a newly wound stator.

The Beakes et al. '043 patent discloses improved winding form assemblies which, as in the Banner '685 assemblies, rely on pockets that receive coil-retaining fingers for preventing the winding forms from moving inwardly of the bore of the stator. The Beakes et al. '043 invention solved shortcomings of the Banner '685 construction, as is described in the Beakes et al. '043 patent. A significant aspect of the Beakes et al. '043 construction was that clamp assemblies held by the female winding forms clamped against surfaces of alignment pins or connecting rods on the male winding forms extended into cooperating apertures in the female winding forms. Because of this construction, the male winding forms could be entirely conventional and both the male and the female winding forms could be manipulated by the same winding form loading and unloading carriages as are used in loading and unloading winding forms that do not have clamps for holding them together. However, the Beakes et al. '043 construction has not been entirely satisfactory. This is partly because the alignment pin clamps do not hold as reliably as they should for high speed, mass production purposes, probably due to vibrations experienced by the winding forms. Also, the coil support extensions and their coil-retaining fingers may bend and permit the winding forms disclosed in both the Banner '685 patent and the Beakes et al. '043 patent to move into the bore of the stator. And, of course, the Banner '685 and the Beakes et al. '043 winding forms can only be used with stators having coil-support extensions with coil-retaining fingers.

SUMMARY OF THE INVENTION

A primary object of this invention is to provide a method and apparatus for winding a two pole stator utilizing shrouds or winding forms which may be rapidly and securely assembled onto a stator core and rapidly disassembled from the stator core. A related object of this invention is to provide a method and an apparatus for winding stators using winding forms that do not require the use of form retaining blades. A further object of this invention is to provide a method and apparatus wherein the steps of assembly and disassembly of the winding forms on the stator cores can be accomplished automatically.

A more specific object of this invention is to provide an improved method and apparatus for supporting stator winding forms on stators which may be used when winding stators which do not have coil-supporting extensions. Yet another object of this invention is to provide an improved method and apparatus for clamping mutually-cooperating winding forms onto a stator core without the use of form retaining blades whereby the forms are reliably retained during high speed stator winding procedures.

In accordance with this invention, a winding form assembly including a pair of winding forms used to wind a stator coil around a pole piece are supported against radial inward movement by the pole piece. A simple and reliable latch mechanism holds the two winding forms together. As in the case of the Beakes et al. '043 construction, standard winding form handling mechanism, which has carriage-mounted support pins protruding into the winding forms, can be used to move the winding forms into position on the stator to be wound. The latch mechanisms inside each pair of cooperating winding forms lock or latch them together automatically as the winding forms are moved into position on the stator to be wound. After placement of the winding forms into proper position, the support pins are removed from the winding forms and backed out of the way for subsequent winding operations. After winding, the support pins are again inserted into the winding forms, the latch mechanisms automatically unlocked, and the forms removed from the winding area. The next stator is then moved into the winding station. Winding form latching and unlatching are caused by, and occur during, movements of the support pins into and out of the winding forms and do not require any machine cycle time separate from the cycle time taken for the carriages to manipulate the winding forms.

Two embodiments of clamp mechanisms are disclosed, one in which the release member is slidably confined within the female winding form and the other in which the release member is pivotally mounted within the winding form.

Other objects and advantages will become apparent from the following description and the drawings.

BRIEF DESCRIPTION OF THE DRAWINGS

FIG. 2 is an exploded perspective view of the upper pair of winding forms of FIG. 1 and a fragment of a winding form support pin that forms part of one of the winding form carriages.

FIG. 3 is a perspective view of one of the upper pair of winding forms as viewed generally from below the illustrated winding form.

FIG. 4 is a fragmentary, longitudinal cross-sectional view of the winding form of FIG. 3. Most of FIG. 4 is taken along the vertical plane containing the longitudinal centerline of the winding form but the lower portion of FIG. 4 intersected by the section line 5—5 is taken on a plane closer to the observer than the center vertical plane. FIG. 4 also includes a fragmentary cross-sectional view of a stator to be wound, and a mounting rail and a latch hook that extend from the opposite winding form.

FIG. 5 is a transverse cross-sectional view of the winding form of FIG. 3 taken along section line 5—5 of FIG. 4. FIG. 5 also shows in dashed lines an end view of the mounting rail and the latch hook that extend from the opposite winding form.

FIG. 6 is a fragmentary, transverse cross-sectional view, taken along section line 6—6 of FIG. 4, of the stator and the mounting rail.

FIG. 7 is a fragmentary, longitudinal cross-sectional view of the winding form of FIG. 3, taken along the vertical plane containing the longitudinal centerline of the winding form. FIG. 7 also includes a fragmentary, transverse cross-sectional view of a carriage-mounted support pin engaged in the winding form, and illustrates the unlatching of the latch hook, a fragment of which is shown partly retracted from the illustrated winding form.

FIG. 8 is a transverse cross-sectional view of the winding form and a fragment of the support pin of FIG. 7 taken along section line 8—8 thereof.

FIGS. 9 and 10 are fragmentary cross-sectional views of a winding form and a latch hook similar to FIGS. 4 and 7, respectively, but illustrating a modified latch hook-retaining member.

FIG. 11 is an exploded perspective view of a stator to be wound and upper and lower pairs of winding forms in accordance with another embodiment of this invention.

FIG. 12 is a fragmentary view of the stator of FIG. 11 and showing diagrammatically the manner in which the winding forms are mounted on a stator pole piece.

DETAILED DESCRIPTION

Figure 1:
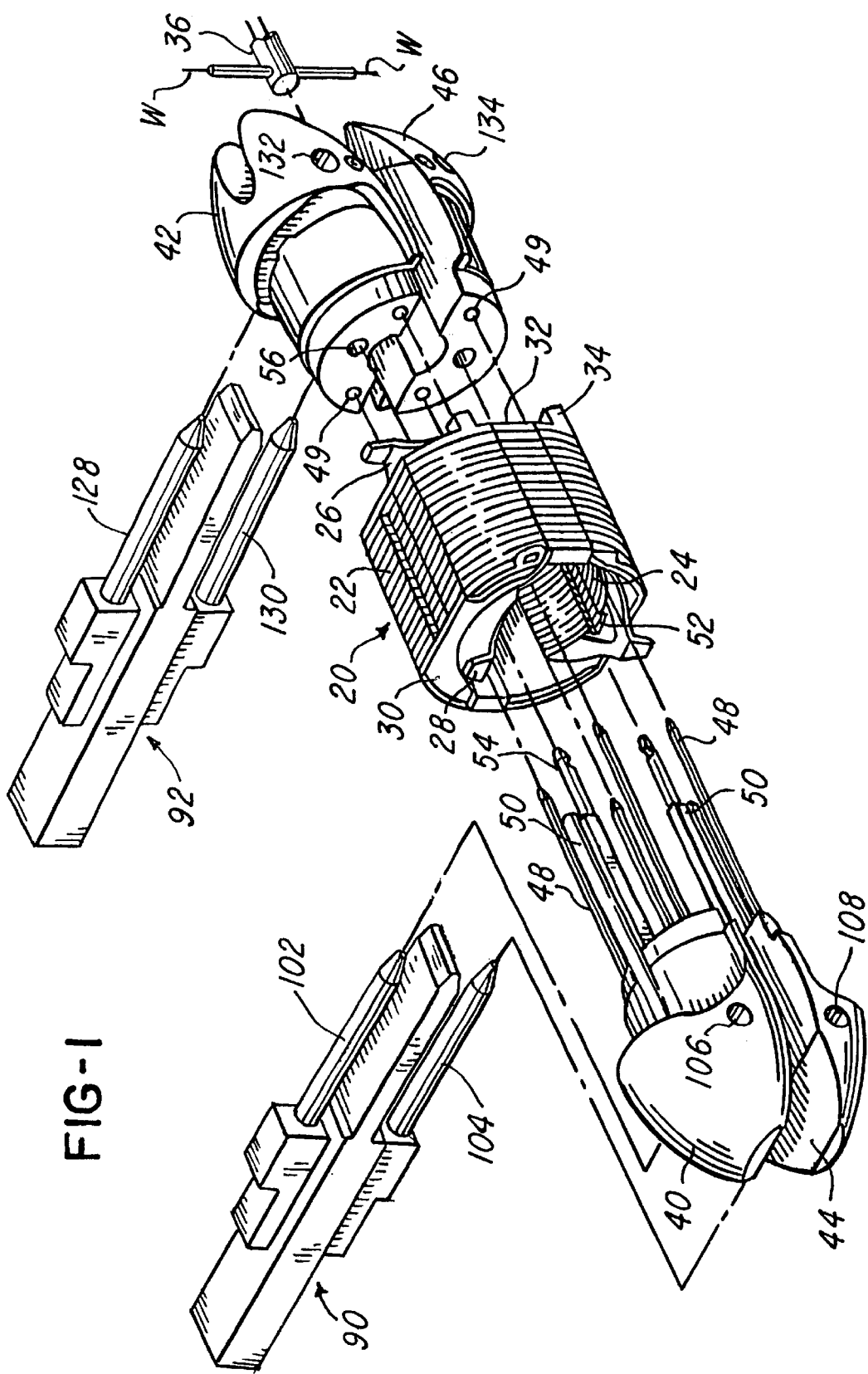
FIG. 1 is an exploded perspective view of a stator to be wound, a fragment of a winding head used to wind coils on the stator, and upper and lower pairs of winding forms in accordance with one embodiment of this invention. In addition, FIG. 1 includes a fragmentary perspective view of portions of carriages for supporting and positioning the winding forms.

With reference to FIG. 1, this invention relates to a stator winding method and apparatus for winding a two pole stator, generally designated 20, for a dynamoelectric device. Stator 20 includes a substantially hollow, generally cylindrical laminated core 22 formed with a pair of longitudinally-extending, diametrically opposed, pole pieces 24. (Only the lower pole piece 24 can be seen in FIG. 1. FIG. 6 shows a fragment of the upper pole piece 24. A cross-sectional view of the upper pole piece is also depicted in FIG. 4.) As is now a common practice, both ends of both pole pieces 24 are provided with longitudinally-extending coil support extensions 26 for supporting the end turns of the stator coils. Coil retaining fingers 28 project generally radially outwardly from the free ends of the coil support extensions 26, i.e. the ends most remote from the end faces of the stator core 22. As will become apparent, this invention is usable for winding stators which do not have coil support extensions and coil retaining fingers. Stator 20 additionally comprises a plastic end plate 30 covering the left end face of the core 22 (as viewed in FIG. 1) and the opposite end face is covered by another plastic end plate or terminal board 32 having sockets 34 for terminal posts (not shown), the construction of which is unimportant for purposes of this invention. The coil support extensions 26 are typically integrally formed with the plastic end plates.

Coils of wire (not shown) are wound on the pole pieces 24 by means of a winding head or ram 36, shown in greatly simplified form in FIG. 1, that draws two wires W from sources of wire under tension (not shown) and reciprocates through the bore of the stator 20 and oscillates at each end of each reciprocating stroke, as well known, to wind two coils simultaneously, one around each pole piece 24. The ram 36 may be driven by the mechanism shown in U.S. Pat. No. 4,158,314, or by any one of several other mechanisms that have been developed for this purpose.

As is also well known, at the beginning of the winding operations, the free ends of the wires W are gripped by wire clamps (not shown) near the stator 20 and, after the coils are wound, the wire segments leading from the wound coils may be temporarily clamped by other clamps (not shown) in fixed relation to the stator 20 and thereafter connected to terminal posts positioned in the sockets 34. The manner in which the wires are handled may be entirely conventional and forms no part of this invention, and is therefore not illustrated or further described herein.

There are four wire-guiding shrouds or winding forms shown in FIG. 1, namely a first, or male, and second, or female, upper winding forms 40 and 42, respectively, and a first, male and second, female lower winding forms 44 and 46, respectively. During assembly together as will be further described below, as is conventional, the first winding forms 40 and 44 are aligned with the respective second winding forms 42 and 46 by alignment pins 48 extending from the first, male forms 40 and 44 into aligned, cooperating sockets 49 in the second, female winding forms 42 and 46. The diameters of the sockets 49 are only slightly (on the order of 0.001 inch) greater than the alignment pins 48 so that there is a close fit between them. The winding forms are preferably made of hardened steel, as is conventional in the art.

As was the case in the aforementioned Banner '685 patent and Beakes '043 patent, the shrouds or winding forms 40, 42, 44 and 46 are secured to the stator core 20 without the use of the usual form-retaining clamps or blades. In accordance with the embodiments illustrated in FIGS. 1 through 10, the male winding forms 40 and 44 are provided with mounting rails 50 that are slidably received within longitudinally-extending grooves 52 in the upper and lower pole pieces 24. As shown best in FIG. 6, the rails 50 and the grooves 52 have sloping sidewalls that extend radially and circumferentially outwardly so that, when the rails 50 are received within the grooves 52, the rails 50 and, therefore, the first winding forms 40 and 44 are supported by the pole pieces 24 from moving radially inwardly into the stator bore. As will become apparent, the second, female winding forms 42 and 46 are latched to and supported by the male winding forms 40 and 44.

With reference to FIGS. 2 through 8, the upper pair of winding forms 40 and 42, when assembled on the stator 20, are not only interfit by their cooperating alignment pins 48 and sockets 49 but are also latched together by means of a latch mechanism including a latch hook 54 extending from the rail 50 into an aligned bore 56 in the second winding form 42. With reference to FIGS. 2, 4 and 7, the latch hook 54 has, at its free end, a hook 58 adapted to be engaged by a vertical flange 60 formed on a latch hook-retaining member 62 housed in pocket 64 in the second, female form 42. As shown in FIG. 5, the retaining member 62 is biased upwardly (i.e. radially outwardly) by a pair of springs 66 acting against wedge members 68 located in a threaded transverse bore 70 and held in the bore by set screws 72.

The lower pair of winding forms 44 and 46, shown only in FIG. 1, form a lower winding form assembly which is an exact mirror image of the upper winding form assembly, as will readily be understood by those familiar with the art. Accordingly, only the upper winding form assembly is further illustrated and described herein.

FIG. 1 illustrates, in a highly simplified manner, a pair of winding form carriages, namely a male winding form carriage 90 and a female winding form carriage 92. Carriages 90 and 92 are used to assemble and disassemble the winding forms 40, 42, 44 and 46 and the stator 20. In practice, an unwound stator 20 would be held by a track (not shown) or other apparatus, such as a turret (not shown), in position to receive the winding forms 40, 42, 44 and 46 at a form-loading station represented in FIG. 1. The form-loading station would also be the winding station if the winding took place at that station—as is suggested by the illustration of the ram 36 in FIG. 1. However, assembly of the forms and the stator could take place either at the winding station or at another station, such as a stator load/unload station.

Male form support carriage 90 includes a pair of horizontal form support pins 102 and 104 adapted to enter, respectively, through bores 106 and 108 in the first, or male, upper and lower winding forms 40 and 44.

Female form carriage 92 includes a pair of horizontal female form support pins 128 and 130 adapted to enter, respectively, through bores 132 and 134 in the right side, or female, upper and lower winding forms 42 and 46.

To better show details, the male winding forms 40 and 44 are shown in FIG. 1 separated from the female forms 42 and 46 and the form supporting parts of the winding form carriages 90 and 92 are shown separated from the winding forms. This condition would not occur in practice. Rather, the winding forms are always supported on the carriages 90 and 92 except when they are supported by the stator being wound.

In operation, with an unwound stator 20 at the form loading station, the winding forms carried by the carriages 90 and 92 are advanced toward the unwound stator to assemble the winding forms 40 and 42 thereon, either simultaneously or in seriatim.

During the advancement of the forms 40 and 42 toward one another, rail 50 enters the groove 52 and the alignment pins 48 enter the sockets 49. At this time, the latch hook-retaining member 62 has been moved to a position wherein it would not interfere with the movements of the latch hook 54 into and out of the bore 56. Such movement of the retaining member 62 occurs whenever the carriage support pin 128 is extended completely into the bore 132 in the female winding form 42 because the support pin 128, upon entry into the bore 132, engages the radially outermost surface of the retaining member 62 and cams it radially inwardly toward the axis of the stator core. This is made apparent by a comparison of FIGS. 4 and 5, showing the parts latched together, and FIGS. 7 and 8, showing the parts unlatched.

Immediately after the winding forms 40 and 42 are assembled onto the stator, the carriages are operated to retract the form support pins 102 and 128 from the winding forms 40 and 42. Before the support pin 128 is fully retracted from the female winding form 42, the support pin 128 moves out of engagement with the retaining member 62, whereupon the bias supplied by the springs 66 pushes the retaining member 62 into engagement with the latch hook, as shown in FIGS. 7 and 8. After the carriages 90 and 92 are fully retracted, the stator coils can be wound. As the coils of wire build up around the pole piece 24, any pressure exerted by the coils tending to push the winding forms 40 and 42 apart will be resisted by the latching provided by the latching members 54 and 62.

After the winding of the stator coils, the winding forms 40 and 42 are removed from the stator by manipulation of the carriages 90 and 92. The manner in which entry of the female winding form support pin 128 into the bore 132 pushes the retaining member 62 out of engagement with the latch hook 54 to unlatch the parts is apparent from the foregoing description.

It will be apparent that the lower winding forms 44 and 46 will be manipulated in the same way as, and simultaneously with, the cooperating upper winding forms 40 and 42.

FIGS. 9 and 10 show a modified female winding form 120 including a latch hook-retaining member 122 which is connected by a pivot pin 124 to the winding form 120, and biased into engagement with a latch hook 126 by a coil spring 127, which may be identical to the latch hook 54 described above. The manner in which the retaining member 122 is pivoted out of latching engagement with the latch hook 126 when the support pin 128 is inserted into the bore 132 is evident from the foregoing description.

FIGS. 11 and 12 show modified winding forms, 200, 202, 204 and 206 which have support pads 208 that engage the radially outermost surfaces of pole tips 210 forming parts of a pole piece 212. Here it will be noted that the support pads 208 are shown engaged with insulating liner or "cell" papers 214 that cover the outer surfaces of the pole pieces 212. The provision of the support pads 208 prevents the winding forms from moving toward the bore of the stator so that the rail 50 of the preceding embodiments is unnecessary. Instead, the male winding forms 200 and 204 are provided with longer latch hooks 216 which cooperate with retaining members (not shown) in the female winding forms 202 and 204, which may be the same as the retaining member 62 of FIGS. 1 through 8 or the retaining member 122 of FIGS. 9 and 10.

Although the presently preferred embodiments of this invention have been described, it will be understood that within the purview of the invention various changes may be made within the scope of the following claims. For example, it is evident that the latch hooks could equivalently extend from the female winding forms (instead of the male winding forms) and the male winding forms could house the retaining members.

We claim:

1. A stator winding apparatus for winding a field coil onto a stator core having pole pieces extending into a bore, said apparatus comprising a winding head assembly that reciprocates and oscillates to draw wire from a source of wire under tension to wind coils, a first winding form, and a second winding form interfitting said first winding form, said winding forms being located on mutually opposite sides of said stator core for guiding the wire around said one of said pole pieces to form a stator coil, said pair of winding forms being supported on said one of said pole pieces against movement of said pair of winding forms inwardly of the bore of the stator core, said first winding form being supported on said one of said pole pieces and said second winding form being supported by said first winding form.

2. A stator winding apparatus for winding a field coil onto a stator core having pole pieces extending into a bore, said apparatus comprising a winding head assembly that reciprocates and oscillates to draw wire from a source of wire under tension to wind coils, a first winding form, and a second winding form interfitting said first winding form, said winding forms being located on mutually opposite sides of said stator core for guiding the wire around said one of said pole pieces to form a stator coil, said pair of winding forms being supported on said one of said pole pieces against movement of said pair of winding forms inwardly of the bore of the stator core, said winding forms being latched to one another by a latch mechanism including a latch hook rigidly connected to said first winding form and extending from said first winding form into an opening in said second winding form, said second winding form having a hook-retaining pocket, a latch hook-retaining member being movably mounted in said pocket, and spring means biasing said latch hook-retaining member into latching engagement with said latch hook.

3. A stator winding apparatus for winding a field coil onto a stator core having pole pieces extending into a bore, said apparatus comprising a winding head assembly that reciprocates and oscillates to draw wire from a source of wire under tension to wind coils, a first winding form, a second winding form interfitting said first winding form, said winding forms being located on mutually opposite sides of said stator core for guiding the wire around said one of said pole pieces to form a stator coil, said pair of winding forms being supported on said one of said pole pieces against movement of said pair of winding forms inwardly of the bore of the stator core, and a winding form carriage that moves said second winding form toward and away from a stator to be wound, said winding form carriage including means for supporting said second winding form when not supported by a stator pole piece.

4. The apparatus of claim 3 wherein said second winding form has a bore extending transversely therethrough, and said winding form carriage includes a winding form-support pin slidable in one said bore for supporting said second winding form when not supported on a stator pole piece.

5. The apparatus of claim 4 wherein said latch-hook retaining member partly extends into the path of said support pin as it moves into said transverse bore, mutually interengaging surfaces of said latch-retaining member and said support pin cooperating to move said latch hook-retaining member out of latching engagement with said latch hook.

6. The apparatus of claim 5 wherein said latch hook-retaining member is linearly slidable in said second winding form.

7. The apparatus of claim 6 wherein said latch hook-retaining member has oppositely-facing sloping sides engaged by wedges and said spring means comprises a pair of springs that bias said wedges toward respectively opposite ones of the sloping sides.

8. The apparatus of claim 6 wherein said latch hook-retaining member is pivotally mounted in said second winding form.

9. The apparatus of claim 8 wherein said spring means comprises a spring engaged with a surface of said latch hook-retaining member.

10. A stator winding apparatus for winding a field coil onto a stator core having pole pieces extending into a bore, said apparatus comprising a winding head assembly that reciprocates and oscillates to draw wire from a source of wire under tension to wind coils, a first winding form, a second winding form interfitting said first winding form, said winding forms being located on mutually opposite sides of said stator core for guiding the wire around said one of said pole pieces to form a stator coil, said pair of winding forms being supported on said one of said pole pieces against movement of said pair of winding forms inwardly of the bore of the stator core, the inner surface of said pole piece having an axially extending groove and one of said winding forms including a rail slidably received within said groove, said groove having surface portions engaging said rail that prevent said rail from moving radially inwardly out of said groove.

11. The apparatus of claim 10 wherein said surface portions of said groove comprise side walls that slope circumferentially outwardly in respectively opposite directions from the radial innermost opening of said groove to the radially outer base of said groove.

12. A winding form assembly for stator winding apparatus for winding a field coil onto a stator core having pole pieces extending into a bore, said winding form assembly comprising a first winding form, a second winding form interfitting said first winding form, said winding forms being located on mutually opposite sides of said stator core for guiding the wire around said one of said pole pieces to form a stator coil, and a latch mechanism for latching said winding forms together, said latch mechanism including a latch hook rigidly connected to said first winding forms and extending from said first winding form into an opening in said second winding form, wherein said second winding form has a hook-retaining pocket, a latch hook-retaining member movably mounted in said pocket, and spring means biasing said latch retaining member into latching engagement with said latch hook.

13. The apparatus of claim 12 further comprising a winding form carriage that moves said second winding form toward and away from a stator to be wound, said winding form carriage including means for supporting said second winding form when not supported by a stator pole piece.

14. The apparatus of claim 13 wherein said second winding form has a bore extending transversely therethrough, and said winding form carriage includes a winding form-support pin slidable in one said bore for supporting said second winding form when not supported on a stator pole piece.

15. The apparatus of claim 14 wherein said latch hook-retaining member partly extends into the path of said support pin as it moves into said transverse bore, mutually interengaging surfaces of said latch hook-retaining member and said support pin cooperating to move said latch hook-retaining member out of latching engagement with said latch hook.

16. The apparatus of claim 14 wherein said latch hook-retaining member is linearly slidable in said second winding form.

17. The apparatus of claim 16 wherein said latch hook-retaining member has oppositely-facing sloping sides engaged by wedges and said spring means comprises a pair of springs that bias said wedges toward respectively opposite ones of the sloping sides.

18. The apparatus of claim 16 wherein said latch hook-retaining member is pivotally mounted in said second winding form.

19. The apparatus of claim 18 wherein said spring means comprises a spring engaged with a surface of said latch hook-retaining member.

* * * * *